Oct. 4, 1966 L. A. KUBICEK 3,276,294
DEBURRING TOOLS
Filed July 10, 1964 2 Sheets-Sheet 1

INVENTOR.
LOUIS A. KUBICEK
BY
*Hanke & Hanke*

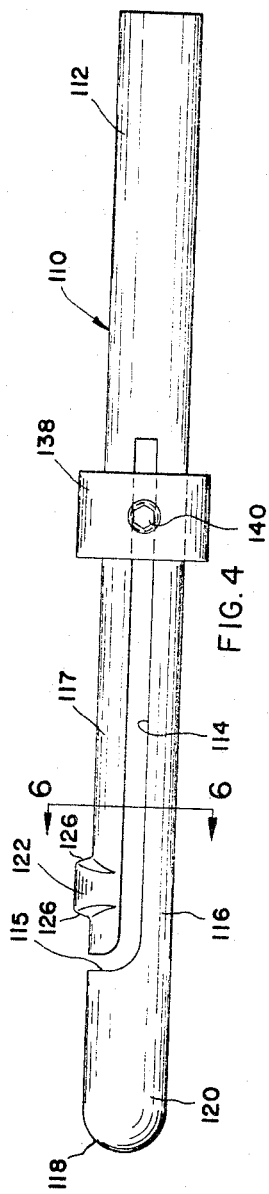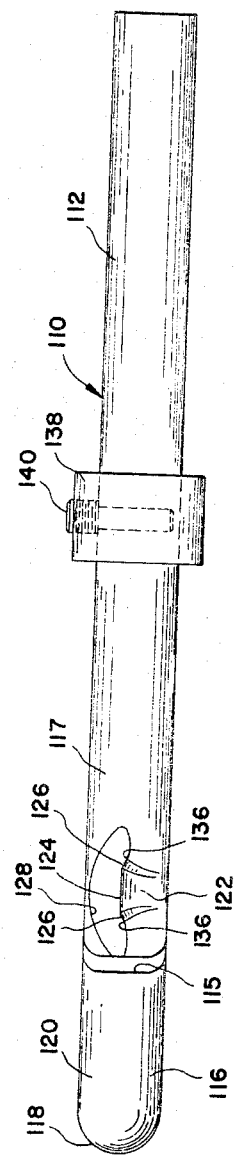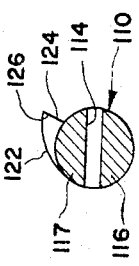

United States Patent Office 3,276,294
Patented Oct. 4, 1966

3,276,294
DEBURRING TOOLS
Louis A. Kubicek, 18435 Weaver St., Detroit, Mich.
Filed July 10, 1964, Ser. No. 381,874
9 Claims. (Cl. 77—73.5)

The present invention relates to tools, particularly to a tool for removing the burrs formed on the edges of drilled holes, and more particularly to improved forms of those deburring tools which may be used to deburr the edges of opposite ends of a hole drilled through a workpiece.

When holes are drilled, ridges or burrs are often produced on the surfaces of the material being drilled. Generally it is necessary or desirable to remove these burrs to facilitate assembly or to produce a finished product. Copending application Ser. No. 105,364, filed by Glen H. Cogsdill, on April 25, 1961 and now Patent No. 3,217,570, and Ser. No. 174,015 filed by Louis A. Kubicek and Joseph L. Toth, on February 19, 1962 and now abandoned in favor of continuation-in-part application which is now Patent No. 3,230,798, disclose improved deburring tools characterized by the provision of a cylindrical body having a through slot formed therein to provide a pair of spaced apart spring arms. The spring arms are adapted to be flexed toward and away from one another and form integral extensions of the unslotted portion of the body. Each of the spring arms is provided with a cutting tool comprising a radial enlargement formed with a cutting edge which extends generally transversely to the longitudinal axis of the slot. The tools disclosed in the aforementioned patents are intended to be used to deburr the edges of opposite ends of holes drilled through a workpiece by rotating the tool and then forcing it through the hole to deburr the leading edge of the hole and then retracting it from the workpiece to deburr the back edge of the hole.

The present invention provides improved deburring tools of the type disclosed in the aforementioned copending applications but characterized by a construction in which a cutting ridge and cutting edges are formed on only one of the spring arms. It is apparent that with the deburring tools constructed as disclosed in the aforementioned copending applications the radial dimension of the cutting edge is limited by the width of the slot formed intermediate the spring arms. That is the width of the slot must be greater than the difference in diameters between the cylindrical body of the tool and the circle formed by the radial enlargements forming the cutting edges to permit the tool to be inserted through the hole to be deburred. By providing the radial enlargement upon only one of the spring arms the length of the cutting edge formed thereon can be substantially doubled without increasing the width of the slot. Thus the surface of the workpiece which is subjected to the cutting action of the tool can be substantially double that possible with the deburring tools of the aforementioned copending applications.

It has also been found that the deburring tools of the present invention tend to follow the hole to be deburred much better than previous tools and are capable therefore of use to deburr the edges of holes drilled into such difficult workpieces as conduit, tubing, and the like.

Further, in those deburring tools in which the cutting ridges are formed on both of the spring arms the vibration produced in one of the spring arms during the operation of the tool is transferred to the other arm to produce objectionable tool chatter. With the tools of the present invention since only one of the arms is used to perform the cutting action, tool chatter is substantially reduced.

It is an object then of the present invention to improve deburring tools of those types characterized by a pair of spring arms and adapted to remove the burrs formed on opposite edges of a hole upon being inserted into the hole and retracted from the hole by providing such a tool with a cutting edge formed on only one of the spring arms.

It is a further object of the present invention to increase the length of the cutting edge which can be formed on slotted deburring tools by providing a cutting tool on only one arm of such tools.

It is a further object of the present invention to improve the cutting action of deburring tools and the like by reducing the total vibration of such tools during use thereof.

Still other objects and advantages of the present invention will readily occur to one skilled in the art to which the invention pertains upon reference to the following drawings in which like reference characters refer to like parts throughout the several views and in which FIG. 1 is a side elevational view, partly in section, illustrating one preferred embodiment of the present invention in use.

FIG. 4 is a side elevational view of another preferred tool of the present invention, and FIG. 5 is a top elevational view of the tool illustrated in FIG. 4, and FIG. 6 is a cross sectional view taken substantially on line 6—6 of FIG. 4.

Figure 2:
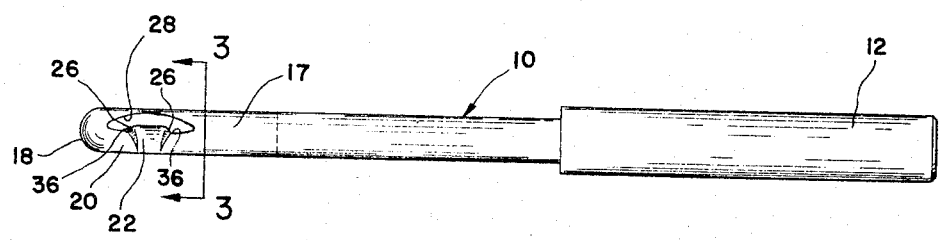
FIG. 2 is a top elevational view of the preferred deburring tool illustrated in FIG. 1.
Figure 1:
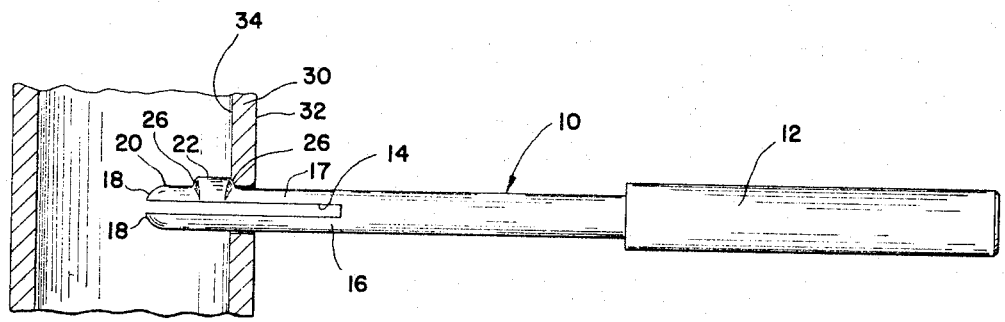
Figure 3:
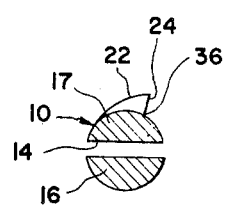
FIG. 3 is a cross-sectional view taken substantially at line 3—3 of FIG. 2.

Now referring to the drawings for a more detailed description of the present invention, one preferred deburring tool is illustrated in FIGS. 1–3 as comprising an elongated substantially cylindrical body member 10 having an enlarged shank portion 12 adapted for insertion into a suitable driving mechanism (not shown). The body member 10 is provided with a longitudinally axially extending tension slot 14 forming a pair of substantially parallel and symmetrical support columns 16 and 17. As illustrated in the drawings, the tension slot 14 extends from one end of the body member 10 and preferably terminates short of the shank portion 12. It is to be understood that where a greater flexibility of the support columns 16–17 is desired, the length of the tension slot 14 can be increased. In the particular embodiment illustrated the shank portion 12 is of a greater diameter than the remainder of the body member 10, but it is to be understood that this is not necessary and that the diameter of the shank portion 12 can be equal to or less than the diameter of the remaining portion of the body member 10.

The free end of each of the support columns 16–17 is preferably provided with a rounded portion 18 which merges with a generally cylindrical pilot portion 20. A cutting ridge 22 is provided on the periphery of the support column 17 adjacent and axially inwardly spaced from the pilot portion 20. The cutting ridge 22 is in the form of a radial enlargement of the body member 10 having a substantially radially extending flat surface portion 24. The flat surface portion 24 defines a pair of axially spaced oppositely inclined cutting edges 26 formed on each side of the cutting ridge 22. The support column 17 may be dished as at 28 to produce sharp corner edges 36.

As illustrated in FIG. 1 the deburring tool of the present invention has been found to be especially useful for deburring holes formed in the walls of tubing, conduit, or the like. In FIG. 1 a tubular work piece 30 has been drilled forming burrs on the outer surface 32 and the inner surface 34. To remove the burrs, the deburring tool of the present invention is rotated by any suitable driving means (not shown) and the pilot portion 20 of the tool is inserted in the hole to be deburred. Axial movement of the tool brings the leading cutting edge 26 to bear against the outer surface 32 to remove the burr formed thereon. Continued axial movement of the tool causes the support columns 16–17 to be cammed inwardly toward one another to permit the cutting ridge 22 to pass through the hole formed in the work piece 30. With the tool in this position, that is, with the cutting ridge positioned within the tubular work piece 30, the tool is retracted from the work piece 30 causing the inner or trailing cutting edge 26 to bear against the inner surface 34 to remove the burr therefrom.

It is apparent that to permit the cutting ridge 22 to pass through the hole formed in the work piece 30, the width of the slot 14 must be greater than the radial dimension of the cutting ridge 22. However, unlike the deburring tools of the aforementioned patents, the length of the cutting edge 26 can be more than one half the width of the slot 14 and in fact can be substantially equal to the width of the slot 14. In other words, with the construction of the present invention the width of the slot 14 can be less than the difference in diameters of the circles formed by the radial enlargement or cutting ridge 22 and the body member 10. This is not possible with deburring tools of heretofore known construction. Thus in effect, the radial dimension of the material which can be removed adjacent the holes of the work piece 30 is substantially doubled by the deburring tool of the present invention.

Further, since the cutting ridge 22 is formed only on the support column 17, during operation of the deburring tool very little vibration is induced in the support column 16. In those deburring tools in which cutting ridges are formed on both of the support columns, vibration induced in one of the support columns is transferred to the other so that vibration and chattering in the tool is the sum of the vibrations produced in both of the support columns. In the present invention, since little vibration is produced in the support columns 16, the resulting total vibrations of the tool is substantially reduced.

FIGS. 4–6 disclose another preferred deburring tool of the present invention as comprising a substantially cylindrical body member 110 having a shank portion 112. The body member 110 is provided with a longitudinally extending tension slot 114. Unlike the embodiment described with reference to FIGS. 1–3, the tension slot 114 extends from adjacent the shank portion 112 and terminates short of the free end of the body member 110. A lateral slot 115 is provided in the body member 110 in communication with the forward end of the tension slot 114. The slots 114–115 form a pair of support columns or spring arms 116–117.

The support column 116 carries the portion of the body member 110 forwardly of the slot 115 and this portion is rounded as at 118 to form a substantially cylindrical solid pilot portion 120. A cutting ridge 122 is provided on the periphery of the support column 117 in a position adjacent and axially inwardly spaced from the pilot portion 120 and the slot 115. The cutting ridge is in the form of a radial enlargement of the body member 110 and is provided with a substantially radially extending flat surface portion 124 defining a pair of axially spaced oppositely inclined cutting edges 126 formed on each side of the cutting ridge 122. The support column 117 may be dished as at 128 to produce sharp corner edges 136.

The deburring tool of FIGS. 4–6 is illustrated as including tension adjusting means like those disclosed in copending application Ser. No. 174,015. The tension adjusting means is operable to vary the effective length of the slot 114 and thereby vary the force required to flex the columns 116–117 toward one another. The tension adjusting means comprises a collar 138 adapted to be longitudinally slidably carried on the outer periphery of the body member 110. The collar 138 carries a pin and set screw combination 140 which as described in the aforementioned copending application is adapted to be locked in longitudinal position on the body member 110 with the pin extending into the tension slot 114.

It is apparent that since the cutting ridge 122 is carried only on the support column 117, the advantages of the tool illustrated in FIGS. 1–3 are also present in the tool of FIGS. 4–6. The tool of FIGS. 4–6 is used in the same manner as the tool of FIGS. 1–3 but is especially useful for deburring aligned holes in a U-shaped workpiece. In such an operation the pilot portion 120 maintains the support column 116 in position and a greater portion of the flexing will occur in support column 117. The tool of FIGS. 4–6 has the added advantage that the solid pilot portion 120 provides a positive and firm lead into the workpiece.

Although it has been preferred to describe the deburring tool of FIGS. 1–3 as having no means for varying the tension on support columns 16–17 so that no means are provided for varying the force required to flex the support columns 16–17 toward one another, it is apparent that any convenient means for varying the effective length of the tension slot 14 can be used for this purpose. The aforementioned copending applications disclose such means and such means is shown in FIGS. 4–6 and it is to be understood that either of these tension adjusting means could be used with the deburring tool of FIGS. 1–3.

It is also apparent that although I have described several embodiments of my invention, many changes and modifications can be made therein without departing from the spirit of the invention as expressed by the appended claims.

I claim:
1. In a cutting tool.
   (a) a substantially cylindrical body member having a through slot formed therein and extending axially to provide a pair of spaced apart spring arms,
   (b) cutting means carried by said body member and consisting of a radial enlargement formed on only one of said spring arms and having a cutting edge which extends generally transversely of the longitudinal axis of said slot, and
   (c) the radial dimension of said radial enlargement being more than half the distance between said arms forming the width of said slot.

2. The cutting tool as defined in claim 1 and in which said radial enlargement is provided with a plurality of said cutting edges, one located at each of the axially opposite ends of said radial enlargement.

3. The cutting tool as defined in claim 1 and in which the width of said slot is substantially equal to the length of said cutting edge.

4. The cutting tool as defined in claim 1 and in which the free ends of said spring arms are rounded and said radial enlargement is axially inwardly spaced therefrom to define a pilot portion.

5. In a cutting tool having a substantially cylindrical body member provided with a through slot formed therein and extending axially to provide a pair of spaced apart spring arms, said spring arms forming integral extensions of the unslotted portion of said body member and cutting means carried on said spring arms, the improvement comprising said cutting means comprising a radial enlargement formed on only one of said spring arms at a point axially inwardly spaced from the free end thereof and having a cutting edge which extends generally transversely of the longitudinal axis of said slot, the radial dimension of said radial enlargement being more than one half the distance between the spring arms forming the width of said slot.

6. The cutting tool as defined in claim 5 and in which the free ends of said spring arms are round to provide a pilot portion.

7. A cutting tool comprising (a) a substantially cylindrical body member having a through slot therein and extending axially to a point adjacent one end of the body member and a lateral slot extending from the periphery of said body member and into said longitudinal slot to define a pair of spaced apart spring arms which are adapted to flex toward and away from one another, (b) said spring arms forming integral extensions of the unslotted portions of said body member, (c) one of said arms only having adjacent but spaced axially inwardly of the free end thereof a radial enlargement formed with a cutting edge which extends generally transversely of the longitudinal axis of said longitudinally extending slot and the radial dimension of said radial enlargement being more than one half the distance between said arms forming said longitudinal slot.

8. The cutting tool as defined in claim 7 and in which (a) one of said spring arms being of a greater axial length than the other of said spring arms, (b) the longer of said spring arms being rounded at the free end thereof and said radial enlargement being axially inwardly spaced therefrom to define a pilot portion.

9. The cutting tool as defined in claim 8 and in which said radial enlargement is carried on the shorter of said spring arms.

References Cited by the Examiner

UNITED STATES PATENTS

| | | | |
|---|---|---|---|
| 605,407 | 6/1898 | Dumaw | 77—73.5 |
| 2,657,597 | 11/1953 | Pickering et al. | 77—73.5 |
| 3,217,570 | 11/1965 | Cogsdill | 77—73.5 |
| 3,230,798 | 1/1966 | Kubicek et al. | 77—73.5 |

FRANCIS S. HUSAR, *Primary Examiner.*